United States Patent
Schuetzle et al.

(10) Patent No.: US 12,071,351 B2
(45) Date of Patent: **\*Aug. 27, 2024**

(54) REVERSE WATER GAS SHIFT CATALYTIC REACTOR SYSTEMS

(71) Applicant: INFINIUM TECHNOLOGY, LLC, Sacramento, CA (US)

(72) Inventors: Robert Schuetzle, Sacramento, CA (US); Dennis Schuetzle, Grass Valley, CA (US); Harold Wright, Menomonee Falls, WI (US); Orion Hanbury, Sacramento, CA (US); Matthew Caldwell, West Sacramento, CA (US); Ramer Rodriguez, Sacramento, CA (US)

(73) Assignee: Infinium Technology, LLC, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/803,835

(22) Filed: Dec. 16, 2022

(65) Prior Publication Data

US 2023/0348277 A1    Nov. 2, 2023

Related U.S. Application Data

(63) Continuation of application No. 17/300,260, filed on May 3, 2021, now Pat. No. 11,597,654.

(60) Provisional application No. 63/101,555, filed on May 4, 2020.

(51) Int. Cl.
*C01B 32/40* (2017.01)
*B01J 8/00* (2006.01)
*C01B 3/38* (2006.01)
*C01B 5/00* (2006.01)
*C10K 3/02* (2006.01)

(52) U.S. Cl.
CPC ............... *C01B 32/40* (2017.08); *B01J 8/001* (2013.01); *C01B 3/38* (2013.01); *C01B 5/00* (2013.01); *C10K 3/026* (2013.01); *B01J 2208/00407* (2013.01); *B01J 2208/00415* (2013.01); *C01B 2203/0277* (2013.01); *C01B 2203/085* (2013.01); *C01B 2203/1258* (2013.01)

(58) Field of Classification Search
CPC .. C01B 32/40; C01B 3/38; C01B 5/00; C01B 2203/0277; C01B 2203/085; C01B 2203/1258; B01J 8/001; B01J 2208/00407; B01J 2208/00415
See application file for complete search history.

(56) References Cited

U.S. PATENT DOCUMENTS

| | | |
|---|---|---|
| 8,551,434 B1 | 10/2013 | Mammadov et al. |
| 2003/0113244 A1 | 6/2003 | DuPont et al. |
| 2019/0359894 A1 | 11/2019 | Heidel et al. |
| 2020/0364216 A1 | 11/2020 | Mortensen |

FOREIGN PATENT DOCUMENTS

WO    2011075845 A1    6/2011

*Primary Examiner* — Jafar F Parsa
(74) *Attorney, Agent, or Firm* — McKinney Law Group APC; Jeffrey A. McKinney

(57) ABSTRACT

The present invention describes a processes, systems, and catalysts for the utilization of carbon dioxide into high quality synthesis gas that can then be used to produce fuels (e.g., diesel fuel) and chemicals. In one aspect, the present invention provides a process for the conversion of a feed gas comprising carbon dioxide and hydrogen to a product gas comprising carbon monoxide and water.

18 Claims, 2 Drawing Sheets

REVERSE WATER GAS SHIFT CATALYTIC REACTOR SYSTEMS

This application is a continuation of U.S. application Ser. No. 17/300,260, filed on May 3, 2021, which claims priority benefit of U.S. Provisional Patent Application No. 63/101,555, filed May 4, 2020. The entire content of these applications is hereby incorporated by reference herein in its entirety.

FIELD OF THE INVENTION

The present invention describes an improved catalytic reactor and associated processes, for the utilization of carbon dioxide into high quality synthesis gas that can then be used to produce fuels (e.g., diesel fuel, jet fuel, gasoline, kerosene, others), chemicals, and other products.

BACKGROUND OF THE INVENTION

Carbon dioxide is produced by many industrial and biological processes. Carbon dioxide is usually discharged into the atmosphere. However, since carbon dioxide has been identified as a significant greenhouse gas, these carbon dioxide emissions need to be reduced from these processes. Although carbon dioxide can be used to enhance oil and gas recovery from wells in limited cases, the majority is emitted into the atmosphere. The preferred method to deal with carbon dioxide is to efficiently capture and utilize the carbon dioxide and convert it into useful products such as fuels and chemicals that can displace fuels and chemicals produced from fossil sources such as petroleum and natural gas and therefore lower the total net emissions of carbon dioxide into the atmosphere.

One reaction that has been considered for utilization of carbon dioxide is the Reverse Water Gas Shift (RWGS) reaction which is often referred to as carbon dioxide hydrogenation.

$$CO_2 + H_2 \leftrightarrow CO + H_2O$$

This reaction converts carbon dioxide and hydrogen to carbon monoxide and water. This reaction is endothermic at room temperature and requires heat to proceed. Elevated temperature and an efficient catalyst are required for significant carbon dioxide conversion to carbon monoxide with minimal or no coking (carbon formation).

Hydrogen ($H_2$) can be produced from many sources including natural gas or more preferably from water via electrolysis or other means.

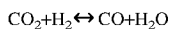
$$H_2O = H_2 + \frac{1}{2}O_2$$

With the CO (Carbon Monoxide) from the RWGS reaction and $H_2$ from the electrolysis of water, one has the potential for useful products. Mixtures of $H_2$ and CO are called synthesis gas or syngas. Syngas may be used as a feedstock for producing a wide range of chemical products, including liquid and gaseous hydrocarbon fuels, alcohols, acetic acid, dimethyl ether and many other chemical products.

Several catalysts have been disclosed for the RWGS reaction. The primary catalysts studied previously were Cu or Pt or Rh dispersed on metal oxide supports. (Daza & Kuhn, RSC Adv. 2016, 6, 49675-49691).

Despite certain reports, there is still a need for novel processes, systems and catalysts related to the RWGS chemical reaction.

BRIEF DESCRIPTION OF THE FIGURES

FIG. 2 shows a cross exchanger to preheat the feed $H_2$ and $CO_2$ with the hot syngas products leaving the RWGS, followed by an electric heater to bring the $H_2$ and $CO_2$ to reaction temperature, and finally the RWGS reactor vessel wherein is a catalyst which converts the $H_2$ and $CO_2$ to CO and $H_2O$.

SUMMARY OF THE INVENTION

The invention relates to a process for the conversion of a feed gas comprising carbon dioxide and hydrogen to a product gas comprising carbon monoxide and water. The feed gas is heated to an inlet temperature greater than 1,400° F., preferably greater than 1,500° F. or more preferably greater than 1,600° F., at least partially in a preheater outside the main reactor vessel to produce a heated feed gas. The preheater uses electricity to generate heat and transfer the heat and produce the heated feed gas. The heated feed gas is sent to a main reactor vessel. The main reactor vessel is an adiabatic or nearly adiabatic vessel where heat loss is minimized. The main reactor vessel contains a catalyst that converts the heated feed gas to product gas. The product gas leaves the main reactor vessel at an exit temperature where the exit temperature is lower than the inlet temperature.

DETAILED DESCRIPTION OF THE INVENTION

Figure 1:
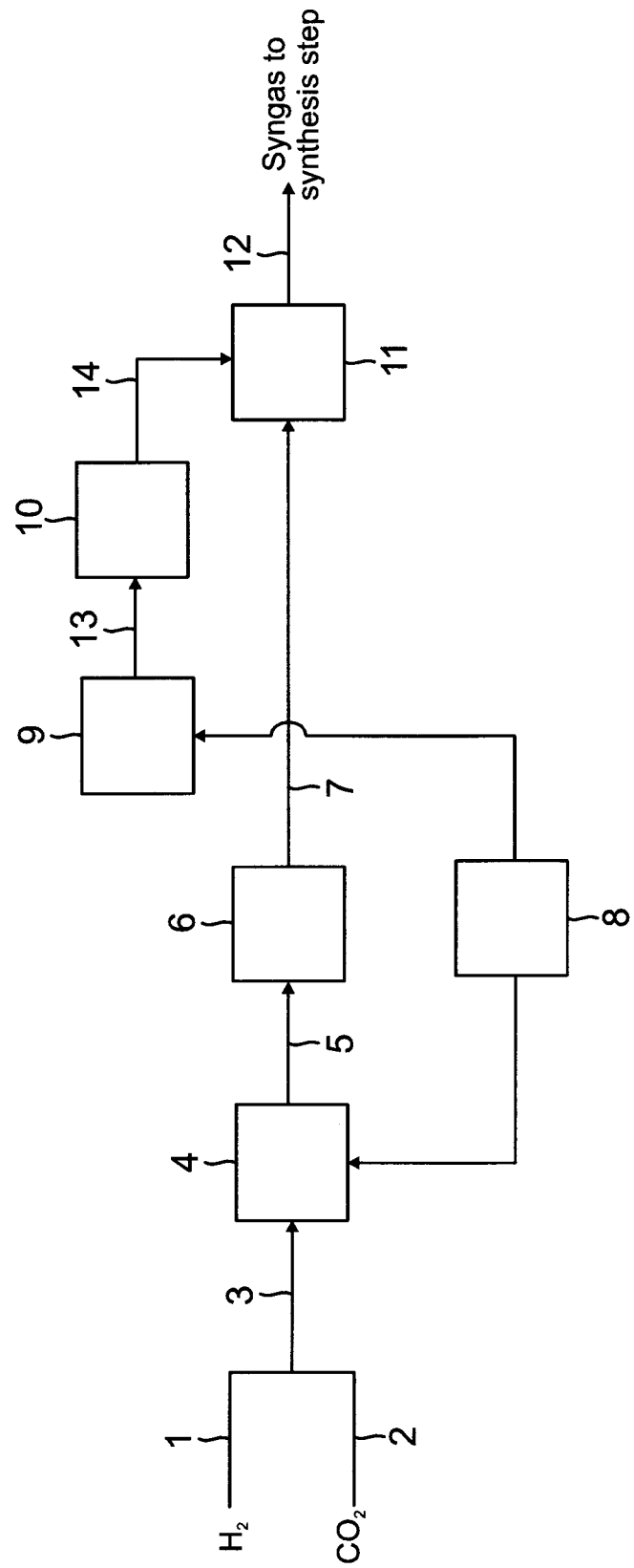
FIG. 1 shows an integrated high efficiency process for the hydrogenation of carbon dioxide using Reverse Water Gas Shift and a unique process scheme for efficient conversion.
Figure 2:
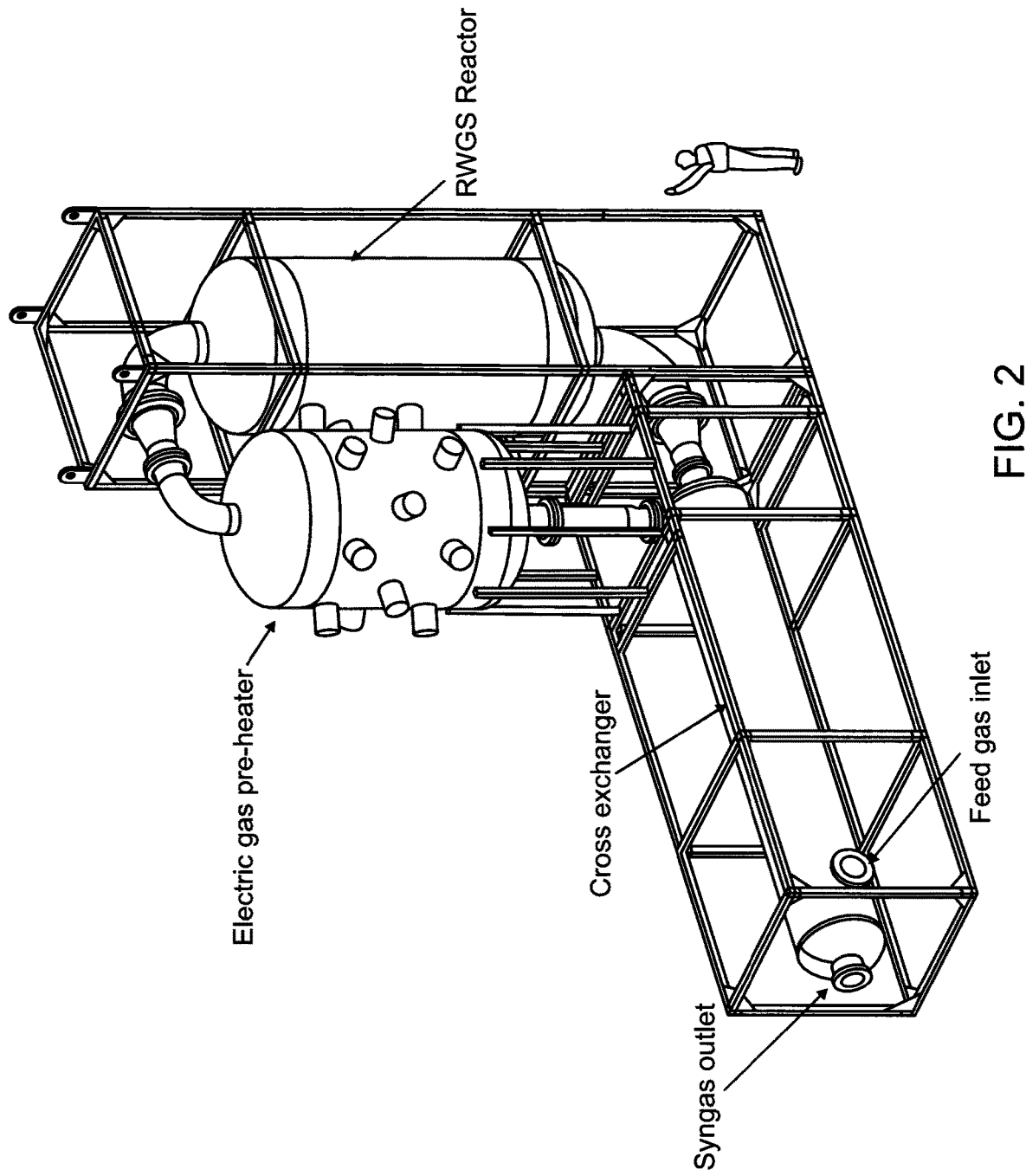
FIG. 2 shows a general arrangement of the unique Reverse Water Gas Shift reactor and associated equipment. Specifically.

FIG. 1 shows a RWGS reactor flowsheet. Hydrogen is one of the feed gases and can be produced by electrolysis of water.

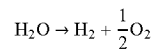
$$H_2O \rightarrow H_2 + \frac{1}{2}O_2$$

Hydrogen can also be produced by the steam reforming of hydrocarbons such as methane or natural gas.

$$CH_4 + H_2O \rightarrow 3H_2 + CO$$

Carbon dioxide can come from numerous industrial and natural sources. $CO_2$ is often found in natural gas deposits. $CO_2$ is emitted from many biological processes such as anaerobic digestion. Many other processes (e.g., power plants, cement plants, ethanol production, petroleum refining, chemical plants, etc.) produce carbon dioxide which is usually discharged into the atmosphere. $CO_2$ can also be found in the atmosphere. $CO_2$ can be captured from these biological, industrial, and atmospheric processes via many known technologies and can be used as feedstock for the invention. $H_2$ stream 1 and $CO_2$ stream 2 are mixed to form stream 3 in FIG. 1. The ratio of $H_2/CO_2$ is between 2.5-4.5 v/v, and preferably between 3.0-4.0 v/v. The mixed feedstock can be heated by indirect heat exchange to a temperature of greater than 1,400° F. It is important that this initial temperature rise is done without the use of direct combustion of a carbon containing gas to provide the heat as that would mean that carbon dioxide was being produced and could possibly negate the impact of converting carbon dioxide to useful fuels and chemicals.

The feed gas comprising a mixture of hydrogen and carbon dioxide is heated to an inlet temperature greater than 1,400° F., preferably greater than 1,500° F., or more preferably greater than 1,600° F., at least partially in a preheater unit 4 outside the main reactor vessel to produce a heated feed gas. The pre-heater is electrically heated and raises the temperature of the feed gas through indirect heat exchange to greater than 1,400° F., preferably greater than 1,500° F., and more preferably greater than 1,600° F. There are numerous ways that the electrical heating of the feed gas can be done. One way is using an electrically heated radiant furnace. In this embodiment, at least a portion of the feed gas passes through a heating coil in a furnace. In the furnace, the heating coil is surrounded by radiant electric heating elements. In another embodiment of the invention, the gas is passed directly over heating elements whereby the gas is heated by convective heat transfer. The electric heating elements can be made from numerous materials. The most common heating elements are nickel chromium alloys. These elements may be in rolled strips or wires or cast as zig zag patterns. The elements are fixed into an insulated vessel where ceramic fiber is generally used for insulation. The radiant elements may be divided into zones to give a controlled pattern of heating. Multiple coils and multiple zones may be needed to provide the energy to produce a heated feed gas. Radiant furnaces require proper design of the heating elements and fluid coils to ensure good view factors and good heat transfer. The electricity usage by the radiant furnace should be as low as possible. The electricity usage by the radiant furnace is less than 0.5 MWh (megawatt-hour) electricity/metric ton (MT) of $CO_2$ in the feed gas; more preferably less than 0.40 MWh/MT $CO_2$; and even more preferably less than 0.20 MWh/MT $CO_2$.

The heated feed gas stream 5 then is fed into the main reactor vessel unit 6. There are two possible embodiments of the main reactor vessel. In the first embodiment, the main reactor vessel is adiabatic or nearly adiabatic and is designed to minimize heat loss, but no added heat is added to the main reactor vessel and the temperature in the main reactor vessel will decline from the inlet to the outlet of the reactor. In the second embodiment, the main reactor vessel is similarly designed but additional heat is added to the vessel to maintain an isothermal or nearly isothermal temperature profile in the vessel. The main reactor vessel is tubular reactor with a length longer than diameter. The entrance to the main reactor vessel is smaller than the overall diameter of the vessel. The main reactor vessel is a steel vessel. The steel vessel is insulated internally to limit heat loss. Various insulations including poured or castable refractory lining or insulating bricks may be used to limit the heat losses to the environment. (See Harbison-Walker Handbook of Refractory Practices, 2005, https://mha-net.org/docs/Harbison%20Walker%202005%20-Handbook.pdf).

A bed of catalyst is inside the main reactor vessel. The catalyst can be in the form of granules, pellets, spheres, trilobes, quadra-lobes, monoliths, or any other engineered shape to minimize pressure drop across the reactor. Ideally the shape and particle size of the catalyst particles is managed such that pressure drop across the reactor is less than 50 pounds per square inch (psi) [345 kPa] and more preferably less than 20 psi [139 kPa]. The size of the catalyst form can have a characteristic dimension of between 1 mm to 10 mm. The catalyst particle is a porous material with an internal surface area greater than 20 $m^2/g$, more preferably greater than 30 $m^2/g$. Several catalyst materials are possible that can catalyze the RWGS reaction. The primary catalysts studied previously were Cu or Pt or Rh dispersed on metal oxide supports. (Daza & Kuhn, RSC Adv. 2016, 6, 49675-49691). We have found that the preferred catalyst is a supported catalyst, where the catalyst is a catalyst that has high thermal stability up to 1,100° C., that does not form carbon (coking) and that has good resistance to contaminants present in captured $CO_2$ streams. The catalyst exhibits high activity at low metal concentrations, such as 0.5-20 wgt %. The shape and particle size of the catalyst are managed such that pressure drop across the reactor is less than 50 pounds per square inch or less than 20 pounds per square inch.

The catalyst used in the process is a high-performance catalyst that is highly versatile, and which efficiently catalyzes the RWGS reaction.

The conversion of carbon dioxide to carbon monoxide in the main reactor vessel is generally between 60 and 90 mole % and more preferably between 70 to 90 mole %. If the embodiment of an adiabatic reactor is used, the temperature in the main reactor vessel will decline from the inlet to the outlet. The main reactor vessel outlet temperature is 100-200° F. less than the main reactor vessel inlet temperature and more preferably between 105-160° F. lower than the main reactor inlet temperature. The Gas Hourly Space Velocity (GHSV), which is the mass flow rate of reactants ($H_2+CO_2$) per hour divided by the mass of the catalyst in the main reactor bed, is between 1,000 and 60,000 $hr^{-1}$ and more preferably 10,000 to 30,000 $hr^{-1}$.

The gas leaving the main reactor vessel is the product gas. The product gas comprises CO, $H_2$, unreacted $CO_2$, and $H_2O$. Additionally, the product gas may also comprise methane ($CH_4$) that was produced in the main reactor vessel by a side reaction. In one embodiment, methane production is preferably less than 10%, in another less than 5%, and in another less than 1%.

The product gas stream 7 can be used in a variety of ways at this point in the process. The product gas can be cooled and compressed and used in downstream process to produce fuels and chemicals. The product gas can also be cooled, compressed in unit 8, and sent back to the preheater and fed back to the main reactor vessel. The product gas can also be reheated in second electric preheater (unit 9) and sent to a second reactor vessel (unit 10) where additional conversion of $CO_2$ to CO can occur. Optional compression (unit 11) can be done before the CO and H (or Syngas) is sent to the liquid fuel synthesis step (stream 12).

FIG. 4 shows a general arrangement detail including the electric gas pre-heater, the RWGS reactor and the cross exchanger. The feed gas comprising a mixture of $H_2CO_2$ enters the shell side of the shell-and-tube cross exchanger where it is heated by the tubes containing the hot product gas leaving the RWGS reactor. The feed gas is then further heated in the electric gas preheater unit where electrically resistive heating elements provide additional thermal energy to raise the temperature of the feed gas to greater than 1,400° F., preferably greater than 1,500° F., and more preferably greater than 1,600° F. The heated feed gas then goes into the RWGS reactor where the $CO_2$ and $H_2$ react over a packed bed of catalyst to form carbon monoxide and water. This reaction in endothermic, causing the temperature to drop within the RWGS reactor or requiring additional electrically resistive heating elements to provide further thermal energy within the RWGS reactor to maintain temperature. The hot product gas from the exit of the RWGS reactor then enters the tube side of the cross exchanger where it is cooled by the incoming feed gas.

Certain Reverse Water Gas Shift Method Embodiments

The following are certain embodiments of processes for the conversion of carbon dioxide to product gas using Reverse Water Gas Shift Catalytic Reactor Systems:

1. Hydrogen and carbon dioxide are mixed and fed into the RWGS catalytic reactor, where the RWGS reactor vessel is adiabatic or nearly adiabatic. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

2. Hydrogen and carbon dioxide are mixed and fed into the RWGS catalytic reactor, where the RWGS reactor vessel where heat is added to the vessel to maintain an isothermal or nearly isothermal temperature profile in the vessel; heating is performed without the use of direct combustion of a carbon containing gas. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

3. Hydrogen and carbon dioxide are mixed and fed into a Reverse Water Gas Shift "RWGS" catalytic reactor at a ratio of $H_2/CO_2$ between 2.5 v/v to 4.5 v/v, or preferably 3.0 v/v to 4.0 v/v, where the RWGS reactor vessel is adiabatic or nearly adiabatic. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

4. Hydrogen and carbon dioxide are mixed and fed into the "RWGS" catalytic reactor at a ratio of $H_2/CO_2$ between 2.5 v/v to 4.5 v/v or preferably 23.0 v/v to 4.0 v/v, where the RWGS reactor vessel where heat is added to the vessel to maintain an isothermal or nearly isothermal temperature profile in the vessel; heating is performed without the use of direct combustion of a carbon containing gas. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

5. Hydrogen and carbon dioxide are mixed, heated to an inlet temperature greater than 1,400° F., preferably greater than 1,500° F., or more preferably greater than 1,600° F. and fed into a Reverse Water Gas Shift "RWGS" catalytic reactor at a ratio of $H_2/CO_2$ between 2.5 v/v to 4.5 v/v or preferably 3.0 v/v to 4.0 v/v, where the RWGS reactor vessel is adiabatic or nearly adiabatic. The main reactor vessel is an insulated steel vessel, and it contains a catalyst bed including a supported catalyst one or more Group 1 and Group 2 metals supported on a metal-alumina spinel. RWGS product gas exits the RWGS reactor vessel.

6. Hydrogen and carbon dioxide are mixed together, heated to an inlet temperature greater than 1,400° F., preferably greater than 1,500° F., or more preferably greater than 1,600° F. and fed into a Reverse Water Gas Shift "RWGS" catalytic reactor at a ratio of $H_2/CO_2$ between 2.5 v/v to 4.5 v/v, or preferably 3.0 v/v to 4.0 v/v, where the RWGS reactor vessel where heat is added to the vessel to maintain an isothermal or nearly isothermal temperature profile in the vessel; heating is performed without the use of direct combustion of a carbon containing gas. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

7. Hydrogen and carbon dioxide are mixed, heated to an inlet temperature greater than 1,400° F., preferably greater than 1,500° F., and more preferably greater than 1,600° F. by an electrically heated radiant furnace and fed into a RWGS catalytic reactor at a ratio of $H_2/CO_2$ between 2.5 v/v to 4.5 v/v or preferably 3.0 v/v to 4.0 v/v, where the RWGS reactor vessel is adiabatic or nearly adiabatic. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

8. Hydrogen and carbon dioxide are mixed together, heated to an inlet temperature greater than 1400° F. or greater than 1500° F. by an electrically heated radiant furnace and fed into a Reverse Water Gas Shift "RWGS" catalytic reactor at a ratio of $H_2/CO_2$ between 2.5 v/v to 4.5 v/v, or preferably 3.0 v/v to 4.0 v/v, where the RWGS reactor vessel where heat is added to the vessel to maintain an isothermal or nearly isothermal temperature profile in the vessel; heating is performed without the use of direct combustion of a carbon containing gas. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

9. Hydrogen and carbon dioxide are mixed, heated to an inlet temperature greater than 1,400° F., preferably greater than 1,500° F., or preferably greater than 1,600° F. by an electrically heated radiant furnace and fed into a Reverse Water Gas Shift "RWGS" catalytic reactor at a ratio of $H_2/CO_2$ between 2.5 v/v to 4.5 v/v or preferably 3.0 v/v to 4.0 v/v. The electric usage by the radiant furnace is less than 0.5 MWh electricity/metric ton of $CO_2$ or less than 0.4 MWh electricity/metric ton of $CO_2$ or less than 0.2 MWh electricity/metric ton of $CO_2$ in the feed gas. The RWGS reactor vessel is adiabatic or nearly adiabatic. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

10. Hydrogen and carbon dioxide are mixed, heated to an inlet temperature greater than 1,400° F., preferably greater than 1,500° F., and more preferably greater than 1,600° F. by an electrically heated radiant furnace and fed into a RWGS catalytic reactor at a ratio of $H_2/CO_2$ between 2.5 v/v to 4.5 v/v and preferably 3.0 v/v to 4.0 v/v. The electric usage by the radiant furnace is less than 0.5 MWh electricity/metric ton of $CO_2$ or less than 0.4 MWh electricity/metric ton of $CO_2$ or less than 0.2 MWh electricity/metric ton of $CO_2$ in the feed gas. The RWGS reactor vessel where heat is added to the vessel to maintain an isothermal or nearly isothermal temperature profile in the vessel; heating is performed without the use of direct combustion of a carbon containing gas. The main reactor vessel is an insulated steel vessel, and it contains a catalyst bed including a supported catalyst where the catalyst consists of one or more Group 1 and Group 2 metals supported on a metal-alumina spinel. The RWGS product gas exits the RWGS reactor vessel.

11. Hydrogen and carbon dioxide are mixed, heated to an inlet temperature greater than 1,400° F., preferably greater than 1,500° F., or more preferably greater then 1,600° F. by an electrically heated radiant furnace and fed into a RWGS catalytic reactor at a ratio of $H_2/CO_2$ between 2.5 v/v to 4.5 v/v or preferably 3.0 v/v to 4.0 v/v. The electric usage by the radiant furnace is less than 0.5 MWh electricity/metric ton of $CO_2$ or less than 0.4 MWh electricity/metric ton of $CO_2$ or less than 0.2 MWh electricity/metric ton of $CO_2$ in the feed gas. The RWGS reactor vessel is adiabatic or nearly adiabatic. The main reactor vessel is an insulated steel vessel that is tubular (length longer than diameter). The reactor contains a catalyst bed including the improved supported catalyst, and it contains a catalyst bed including a supported catalyst where the catalyst consists of one or more Group 1 and Group 2 metals supported on a metal-alumina spinel. The RWGS product gas exits the RWGS reactor vessel.

12. Hydrogen and carbon dioxide are mixed together, heated to an inlet temperature greater than 1,400° F., preferably greater than 1,500° F., and more preferably greater than 1,600° F. by an electrically heated radiant furnace and fed into a RWGS catalytic reactor at a ratio of $H_2/CO_2$ between 2.5 v/v to 4.5 v/v, and preferably 3.0 v/v to 4.5 v/v. The electric usage by the radiant furnace is less than 0.5 MWh electricity/metric ton of $CO_2$ or less than 0.4 MWh electricity/metric ton of $CO_2$ or less than 0.2 MWh electricity/metric ton of $CO_2$ in the feed gas. The RWGS reactor vessel where heat is added to the vessel to maintain an isothermal or nearly isothermal temperature profile in the vessel; heating is performed without the use of direct combustion of a carbon containing gas. The main reactor vessel is an insulated steel vessel that is tubular (length longer than diameter). The reactor contains a catalyst bed including a supported catalyst, where the catalyst consists of one or more Group 1 and Group 2 metals supported on a metal-alumina spinel. The RWGS product gas exits the RWGS reactor vessel.

13. Hydrogen and carbon dioxide are mixed, heated to an inlet temperature greater than 1,400° F., r preferably greater than 1,500° F., and more preferably greater than 1,600° F. by an electrically heated radiant furnace and fed into RWGS catalytic reactor at a ratio of $H_2/CO_2$ between 2.5 v/v to 4.5 v/v, and preferably 3.0 v/v to 4.0 v/v. The electric usage by the radiant furnace is less than 0.5 MWh electricity/metric ton of $CO_2$ or less than 0.4 MWh electricity/metric ton of $CO_2$ or less than 0.2 MWh electricity/metric ton of $CO_2$ in the feed gas. The RWGS reactor vessel is adiabatic or nearly adiabatic. The main reactor vessel is an insulated steel vessel that is tubular (length longer than diameter). The reactor contains a catalyst bed including a supported catalyst where the catalyst consists of one or more Group 1 and Group 2 metals supported on a metal-alumina spinel. The RWGS product gas exits the RWGS reactor vessel.

EXAMPLES

Example 1: Process Flowsheet Results with Adiabatic Main Reactor Vessel

FIG. 1 shows the overall process flow for this example. Table 1 shows the stream summary for this flowsheet example. Stream Number 1 ($CO_2$) and Stream Number 2 (Hydrogen from electrolysis) are mixed and form Stream Number 3 which heated via indirect heat exchange from approximately 70-984° F. This is the Feed Gas stream, stream 35, is the Heated Feed Gas Stream. Electric heater unit 4 heats the feed gas from 984° F. to 1,600° F. The pre-heater is an electric radiant furnace that uses 30.7 MW of electricity to accomplish the heating. For this example, the main reactor vessel unit 6 is adiabatic. Stream Number 7 is the Product Gas. The temperature of the product gas has fallen from 1600° F. to 144° F. The $CO_2$ conversion is 70 mol %. The pressure drops across the RWGS reactor unit 6 is 10 psi.

In this example, the Product Gas is heated back to 1600° F. in a second preheater unit 9 to produce stream 13 and is then reacted in a second reactor vessel unit 10 to produce stream 14. The $CO_2$ conversion in the second reactor is 7%.

TABLE 1

Stream Summaries for Example 1 from Process Flow in FIG. 1

| Stream No. | 1 | 2 | 3 | 5 | 7 | 13 | 14 |
|---|---|---|---|---|---|---|---|
| Temp ° F. | 61.0 | 70.0 | 983.9 | 1600.0 | 1447.9 | 1600.0 | 1491.8 |
| Pres (psig) | 60 | 60 | 56 | 55 | 45 | 44 | 34 |
| Total (lbmol/h) | 5525 | 13798 | 19322 | 19322 | 18698 | 18698 | 19036 |
| Total (lb./h) | 243177 | 27813 | 270990 | 270990 | 270990 | 270990 | 270990 |
| Component mole frac | | | | | | | |
| Hydrogen | 0.00 | 1.00 | 0.71 | 0.71 | 0.48 | 0.48 | 0.49 |
| Carbon Monoxide | 0.00 | 0.00 | 0.00 | 0.00 | 0.19 | 0.19 | 0.20 |
| Methane | 0.00 | 0.00 | 0.00 | 0.00 | 0.02 | 0.02 | 0.01 |
| $CO_2$ | 1.00 | 0.00 | 0.29 | 0.29 | 0.09 | 0.09 | 0.08 |
| $H_2O$ | 0.00 | 0.00 | 0.00 | 0.00 | 0.22 | 0.22 | 0.22 |

The invention claimed is:

1. A process for the conversion of a feed gas comprising carbon dioxide and hydrogen to a product gas comprising carbon monoxide and water where:
   a. the feed gas is heated to an inlet temperature greater than 1,400° F. in a preheater outside the main reactor vessel to produce a heated feed gas, wherein the preheater is an electrically heated radiant furnace;
   b. the radiant furnace uses electricity to generate heat and produce the heated feed gas, and wherein the radiant furnace uses less than 0.5 MWH electricity/metric ton of $CO_2$;
   c. the heated feed gas is sent to a main reactor vessel, wherein the main reactor vessel has an inlet temperature and an outlet temperature, and wherein the main reactor vessel outlet temperature is 100 to 200° F. less than the main reactor vessel inlet temperature, and wherein there is a mass flow rate of reactants in the main reactor vessel, and wherein the mass flow rate is between 1,000 and 60,000$^{-1}$;

d. the main reactor vessel is maintained at or near isothermal conditions;

e. the main reactor vessel contains catalyst that converts the heated gas to the product gas.

2. The process of claim 1 wherein the carbon dioxide used comes from biological processes.

3. The process of claim 1 wherein the carbon dioxide used comes from industrial processes.

4. The Process of claim 1 wherein the carbon dioxide used comes from atmospheric processes.

5. The process of claim 1 wherein the shape and particle size of the catalyst particles used in the main reactor vessel is managed such that pressure drop across the reactor is less than 50 pounds per square inch.

6. The process of claim 1 wherein the catalyst particle is a porous material with an internal surface area greater than 20 m$^2$/g.

7. The process of claim 6 wherein the catalyst comprises a metal from Group 1 and Group 2 supported on a metal-alumina spinel.

8. The process of claim 1 wherein the feed gas has a ratio of H2/CO2 between 2.5 v/v to 4.5 v/v.

9. The process of claim 1 wherein the feed gas is heated to a temperature greater than 1500° F.

10. A process for the conversion of a feed gas comprising carbon dioxide and hydrogen to a product gas comprising carbon monoxide and water where:

a. the feed gas is heated to an inlet temperature greater than 1,400° F. in a preheater outside the main reactor vessel to produce a heated feed gas, wherein the preheater is an electrically heated radiant furnace:

b. the preheater uses electricity to generate heat and produce the heated feed gas, and wherein the radiant furnace uses less than 0.5 MWH electricity/metric ton of CO$_2$;

c. the heated feed gas is sent to a main reactor vessel, wherein the main reactor vessel has an inlet temperature and an outlet temperature, and wherein the main reactor vessel outlet temperature is 100 to 200° F. less than the main reactor vessel inlet temperature, and wherein there is a mass flow rate of reactants in the main reactor vessel, and wherein the mass flow rate is between 1,000 and 60,000$^{-1}$;

d. the main reactor vessel is an adiabatic or nearly adiabatic vessel where heat loss is minimized;

e. the main reactor vessel contains catalyst that converts the heated feed gas to the product gas;

f. the product gas leaves the main reactor at an exit temperature where the exit temperature is lower than the inlet temperature.

11. The process of claim 10 wherein the carbon dioxide used comes from biological processes.

12. The process of claim 10 wherein the carbon dioxide used comes from industrial processes.

13. The Process of claim 10 wherein the carbon dioxide used comes from atmospheric processes.

14. The process of claim 10 wherein the shape and particle size of the catalyst particles used in the main reactor vessel is managed such that pressure drop across the reactor is less than 50 pounds per square inch.

15. The process of claim 10 wherein the catalyst particle is a porous material with an internal surface area greater than 20 m$^2$/g.

16. The process of claim 15 wherein the catalyst comprises a metal from Group 1 and Group 2 supported on a metal-alumina spinel.

17. The process of claim 10 wherein the feed gas has a ratio of H2/CO2 between 2.5 v/v to 4.5 v/v.

18. The process of claim 10 wherein the feed gas is heated to a temperature greater than 1500° F.

* * * * *